United States Patent
Kim et al.

(10) Patent No.: US 12,451,525 B2
(45) Date of Patent: Oct. 21, 2025

(54) BATTERY DEVICE

(71) Applicant: LG ENERGY SOLUTION, LTD., Seoul (KR)

(72) Inventors: Jeong Wook Kim, Daejeon (KR); Jae Hong Kim, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 616 days.

(21) Appl. No.: 17/794,056

(22) PCT Filed: Oct. 12, 2021

(86) PCT No.: PCT/KR2021/014041
§ 371 (c)(1),
(2) Date: Jul. 20, 2022

(87) PCT Pub. No.: WO2022/080829
PCT Pub. Date: Apr. 21, 2022

(65) Prior Publication Data
US 2023/0045593 A1    Feb. 9, 2023

(30) Foreign Application Priority Data
Oct. 14, 2020   (KR) ................. 10-2020-0132676

(51) Int. Cl.
*H01M 10/42*    (2006.01)
*H01M 50/244*    (2021.01)

(52) U.S. Cl.
CPC ..... *H01M 10/4207* (2013.01); *H01M 10/425* (2013.01); *H01M 50/244* (2021.01); *H01M 2010/4271* (2013.01)

(58) Field of Classification Search
CPC .......... H01M 10/4207; H01M 10/425; H01M 50/244; H01M 2010/4271
See application file for complete search history.

(56) References Cited

U.S. PATENT DOCUMENTS

| | | | |
|---|---|---|---|
| 6,624,612 B1 * | 9/2003 | Lundquist | H01M 10/4207 320/133 |
| 2002/0017895 A1 * | 2/2002 | Kawashima | H02J 7/0019 320/118 |

(Continued)

FOREIGN PATENT DOCUMENTS

| | | |
|---|---|---|
| EP | 1 967 861 A2 | 9/2008 |
| JP | 2001-178008 A | 6/2001 |

(Continued)

OTHER PUBLICATIONS

Machine Translation of JP-2007103357-A (Feb. 19, 2025) (Year: 2025).*

(Continued)

*Primary Examiner* — Matthew J Merkling
(74) *Attorney, Agent, or Firm* — Birch, Stewart, Kolasch & Birch, LLP (57) ABSTRACT

A battery apparatus includes: a plurality of battery cells; a battery management system (BMS) for managing the plurality of battery cells; and a connection controller for sequentially connecting the plurality of battery cells to the BMS, and the connection controller connects a corresponding battery cell to the BMS according to a potential of a lower battery cell and a potential of the corresponding battery cell.

18 Claims, 4 Drawing Sheets

(56) References Cited

U.S. PATENT DOCUMENTS

| | | | |
|---|---|---|---|
| 2012/0319652 A1 | 12/2012 | Namou et al. | |
| 2014/0002003 A1 | 1/2014 | Kim | |
| 2015/0002096 A1 | 1/2015 | Suzuki | |
| 2015/0244191 A1 | 8/2015 | Matsumura et al. | |
| 2015/0280464 A1* | 10/2015 | Kang | H02J 7/0048 320/116 |
| 2015/0340743 A1 | 11/2015 | Fink | |
| 2016/0336623 A1* | 11/2016 | Nayar | H02J 7/0068 |
| 2020/0124678 A1 | 4/2020 | Kim | |
| 2020/0177019 A1 | 6/2020 | Yasoshima et al. | |
| 2020/0203702 A1 | 6/2020 | Park et al. | |
| 2023/0207895 A1* | 6/2023 | Kim | H01M 50/503 429/7 |
| 2023/0261481 A1* | 8/2023 | Lesso | H02J 7/345 320/118 |

FOREIGN PATENT DOCUMENTS

| | | | | |
|---|---|---|---|---|
| JP | 2007103357 A * | 4/2007 | | H01M 8/04552 |
| JP | 2007-225484 A | 9/2007 | | |
| JP | 2012-23802 A | 2/2012 | | |
| JP | WO2013/035176 A1 | 3/2013 | | |
| JP | 2014-103785 A | 6/2014 | | |
| JP | 6116943 B2 | 4/2017 | | |
| JP | 2020-89174 A | 6/2020 | | |
| KR | 10-2014-0003201 A | 1/2014 | | |
| KR | 10-2016-0028205 A | 3/2016 | | |
| KR | 10-2016-0046220 A | 4/2016 | | |
| KR | 10-1680189 B1 | 11/2016 | | |
| KR | 10-2019-0086093 A | 7/2019 | | |
| KR | 10-2020-0077916 A | 7/2020 | | |
| WO | WO-2013083141 A1 * | 6/2013 | | B60L 58/15 |

OTHER PUBLICATIONS

Extended European Search Report for European Application No. 21880476.3, dated Jul. 11, 2023.
International Search Report (PCT/ISA/210) issued in PCT/KR2021/014041, dated Jan. 24, 2022.

* cited by examiner

BATTERY DEVICE

TECHNICAL FIELD

The present invention relates to a battery apparatus, and more particularly, to a battery apparatus capable of preventing electrical damage to a Battery Management System (BMS) when a battery cell is connected to the BMS.

BACKGROUND ART

A rechargeable battery capable of charging and discharging, that is, a battery, is widely used as an energy source for mobile devices such as smartphones. In addition, the battery is also used as an energy source for electric vehicles, hybrid electric vehicles, and the like, which are suggested as a way to solve air pollution caused by gasoline and diesel vehicles using fossil fuels.

The types of applications using batteries are diversifying due to the advantages of batteries, and it is expected that batteries will be applied to more fields and products in the future than now.

Batteries are also classified into lithium-ion batteries, lithium-ion polymer batteries, and lithium polymer batteries according to the composition of electrodes and electrolytes, and among them, the use of lithium ion polymer batteries, which are less likely to leak electrolyte and are easy to manufacture, is increasing.

Although batteries are widely used as energy sources for various products, since various combustible materials are built-in, there is a risk of heat generation and explosion due to overcharging, overcurrent, and other physical external shocks. In order to avoid these problems, a protection circuit that cuts off current in case of overcharge, overdischarge, and overcurrent, a Positive Temperature Coefficient (PTC) Element that blocks current by greatly increasing resistance when temperature rises, and a safety system such as safety vents that block current or exhaust gas when pressure rises due to gas generation are provided, and in the mid-to-large battery pack of a multi-cell structure, which consists of a structure in which a plurality of battery modules are combined, a safety system such as a fuse, a bimetal, and a battery management system (BMS) are provided to protect the battery cells from overdischarge, overcharge, and overcurrent.

The BMS is electrically connected to the plurality of battery cells. At this time, in order to prevent damage to the IC due to the influence of the internal relative potential and absolute voltage withstand voltage of the integrated circuit (IC) when the battery cell and the BMS are connected, each battery cell should be electrically connected to the cell connection terminal of the BMS. That is, in the process in which the battery cell and the integrated circuit (IC) of the BMS are electrically connected, the withstand voltage value for each connection terminal of the IC is different, so that there may be a problem that the IC is destroyed by high pressure.

As a conventional way to solve this problem, a method of physically connecting the battery cell and the BMS first by applying a solder eye and then electrically connecting them can be used. Here, the solder eye is a structure in which an insulating portion is included on the terminal connection member, and refers to a structure in which electrical connection is not made in the process of arranging battery cells, but is electrically connected in the process of coupling the electrode terminal and the terminal connection member. However, this method has a problem of increasing the manufacturing cost due to the addition of materials and processes.

As another conventional method for solving the above problem, a method in which an operator performs soldering in order is used. That is, a low battery cell to a high battery cell should be sequentially connected to the BMS. For example, assuming that first to n-th battery cells are arranged from bottom to top, the first to n-th battery cells are sequentially connected to the BMS. However, in this method, there is a possibility of occurrence of defects due to the immaturity of the operator. That is, if the batteries are not sequentially soldered from the low battery cells, cell power may be randomly applied to the BMS IC, causing electrical damage to the IC. That is, power for IC operation is received from the battery cell, and if the ground is not connected first or, the first to n-th battery cells are connected from the middle, for example, although more than 4.2V should not be applied to the input pin of the IC, two or more battery cells are connected so that as more than the allowable voltage is applied to the IC, electrical damage occurs. Electrical damage causes an IC failure when a current or voltage is applied over a permissible value.

As a known prior art document in this regard, there is Korean Patent Registration No. 10-1680189.

DISCLOSURE OF THE INVENTION

Technical Problem

The present invention provides a battery apparatus in which electrical connection between a battery cell and a BMS is sequentially performed.

The present invention provides a battery apparatus that includes a switching circuit to automatically block a path through which a voltage of a lower battery cell is input to a BMS when a voltage of a lower battery cell is not input.

Technical Solution

A battery apparatus according to one aspect of the present invention includes: a plurality of battery cells; a battery management system (BMS) configured to manage the plurality of battery cells; and a connection controller configured to sequentially connect the plurality of battery cells to the BMS, wherein the connection controller connects a corresponding battery cell among the plurality of battery cells to the BMS according to a potential of a lower battery cell that is connected to the BMS before the corresponding battery cell and a potential of the corresponding battery cell.

The connection controller allows batteries from the lowest battery cell to the top battery cell to be sequentially connected to the BMS in one direction.

According to the connection controller, when battery cells among the plurality of battery cells are connected randomly, a first battery cell is not connected to the BMS and when battery cells are connected in sequence, the first battery cell is connected to the BMS.

The connection controller is mounted on a substrate on which the BMS is mounted.

The connection controller is provided between a plurality of connection terminals, each connection terminal extending from a respective one of the plurality of battery cells and an integrated circuit (IC) connection terminal of the BMS.

The connection controller includes a plurality of switches.

The plurality of switches are driven according to a potential of the lower battery cell and a potential of the corresponding battery cell to apply the potential of the corresponding battery cell to the BMS.

The connection controller allows the lowermost battery cell among the plurality of battery cells to be directly connected to the BMS, allows the uppermost battery cell among the plurality of battery cells to be connected to the BMS through one switch, and allows battery cells among the plurality of battery cells between the lowest and highest battery cells to be connected to the BMS through two switches.

The uppermost battery cell is connected to the BMS through a P-type FET, and the battery cells between the lowermost and uppermost battery cells are connected to the BMS through the P-type FET and an N-type FET.

The P-type FETs of the battery cells between the lowermost battery cell and the uppermost battery cell are driven according to the potential of the lower battery cell and the potential of the corresponding battery cell to transfer the potential of the corresponding battery cell to the BMS, and wherein the N-type FET is driven according to the ground potential and the potential of the corresponding battery cell to maintain the initial potential of the P-type FET of the upper battery cell.

The battery apparatus further includes diodes connected in parallel to the P-type FETs and the N-type FETs, respectively.

Advantageous Effects

According to the present invention, a connection control unit is provided between the connection terminal of the battery cell and the IC connection terminal of the BMS, and the battery cells are sequentially connected to the BMS by the connection control unit. That is, the connection control unit may be sequentially connected to the IC of the BMS from a battery cell having a lower order to a battery cell having a higher order, that is, from a lower order to a higher order. In addition, when any battery cells are randomly connected without being sequentially connected, the corresponding battery cells may be connected to the BMS only when they are not connected to the BMS and connected in order.

Therefore, since it is not necessary to apply a solder eye, it is possible to prevent an increase in manufacturing cost. In addition, even when the operator performs soldering in order, it is possible to prevent the occurrence of defects due to the inexperience of the operator, that is, electrical damage to the IC of the BMS 200.

MODE FOR CARRYING OUT THE INVENTION

Hereinafter, exemplary embodiments of the present invention will be described in detail with reference to the accompanying drawings. However, the present invention is not limited to the embodiments disclosed below, but will be implemented in various different forms, and these embodiments are provided to complete the disclosure of the present invention, and to fully inform a person of ordinary skill in the scope of the invention.

Figure 1:
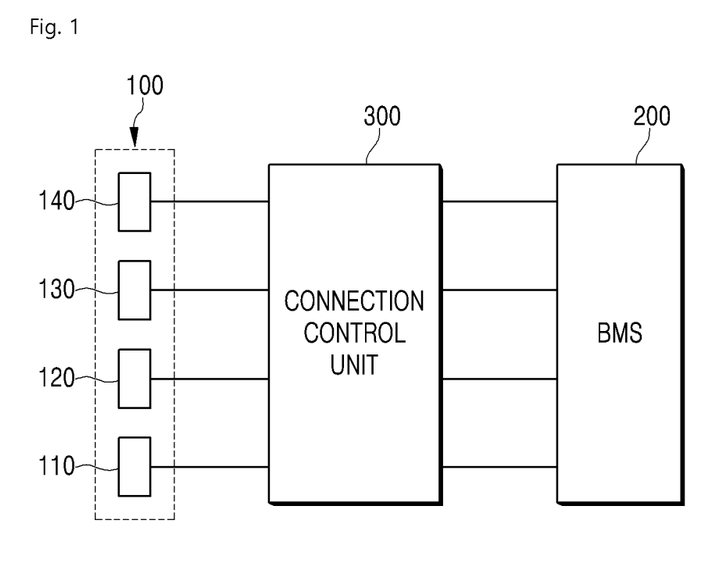
FIG. 1 is a block diagram of a battery apparatus according to an embodiment of the present invention.
Figure 2:
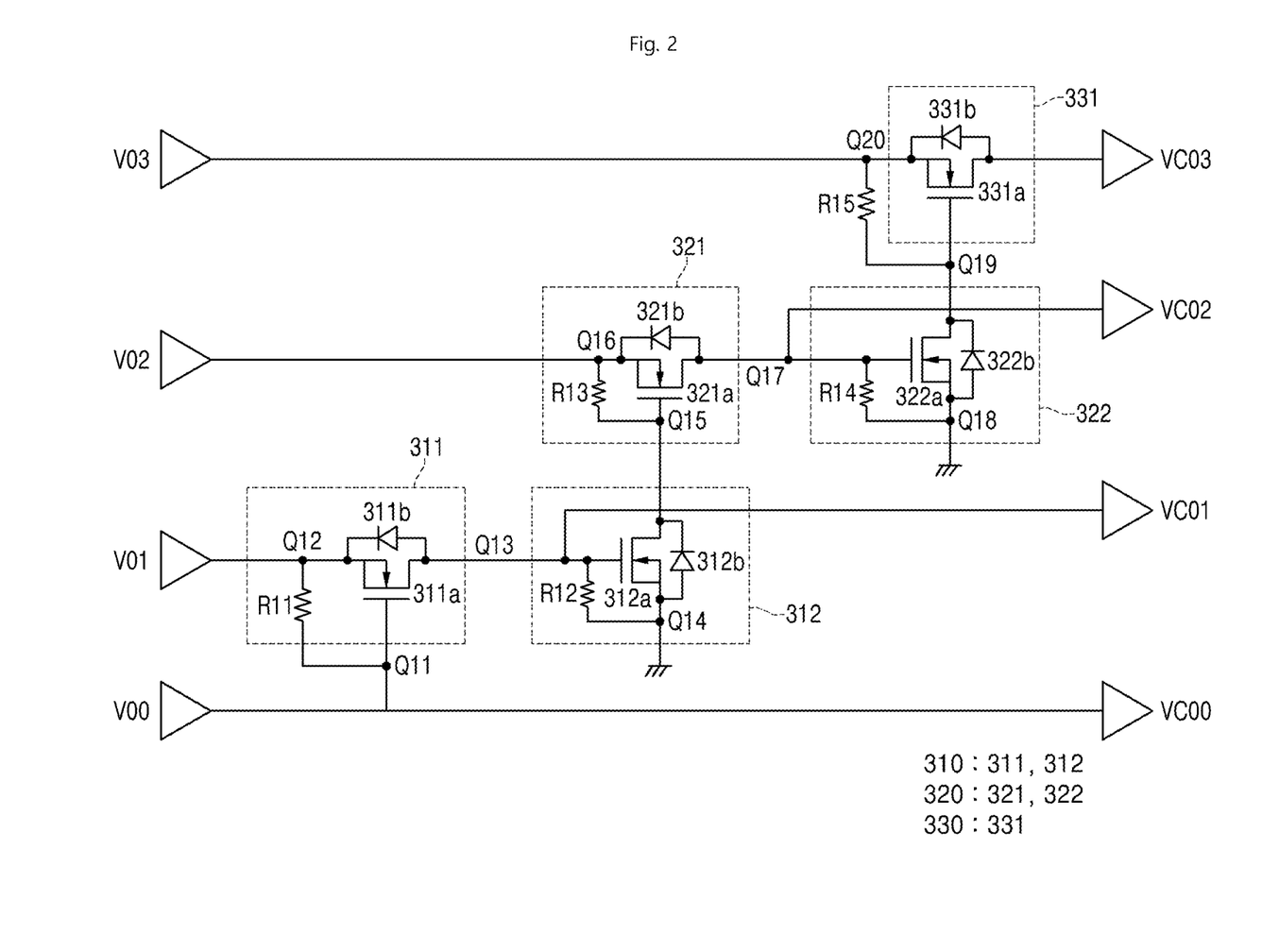
FIG. 2 is a partial circuit diagram of a battery apparatus according to an embodiment of the present invention.

FIG. 1 is a block diagram for explaining the configuration of a battery apparatus according to an embodiment of the present invention. Also, FIG. 2 is a partial circuit diagram of a battery apparatus according to an embodiment of the present invention, and is a circuit diagram for explaining a connection control unit constituting the battery apparatus.

Referring to FIG. 1, the battery apparatus according to embodiments of the present invention includes a battery 100 including a plurality of battery cells 110 to 14, a BMS 200 for managing the battery 100, and a connection control unit 300 provided in the BMS 200 and sequentially connecting the battery cells 110 to 140 to the BMS 200.

1. Battery

The battery 100 is an electrical energy source that provides energy to the power consuming device to drive the power consuming device. Here, the power consuming device may include a mobile device such as a smart phone, an electric vehicle, a hybrid electric vehicle, and the like. The battery 100 may include at least one battery pack, each of the at least one battery pack may include a plurality of battery modules, and the battery module may include a plurality of chargeable and dischargeable battery cells. That is, the battery 100 includes a plurality of battery cells, a plurality of battery cells may be bundled into a predetermined unit to form a battery module, and a plurality of battery modules may form one battery pack. Also, although not shown in the drawing, a plurality of battery cells constituting the battery 100 may be sequentially connected in one direction. That is, the plurality of battery cells 110 to 140 may be connected in one direction, for example, in a vertical direction, and the first to n-th battery cells may be sequentially connected from the lower side. Meanwhile, the plurality of battery cells may be connected in series and/or in parallel in various ways to meet the specification of the power consuming device. Of course, a plurality of battery packs each including a plurality of battery cells 110 to 140 may also be connected in series and/or in parallel. Here, the type of the battery cell is not particularly limited, and may include, for example, a lithium ion battery, a lithium polymer battery, a nickel cadmium battery, a nickel hydrogen battery, a nickel zinc battery, and the like.

2. BMS

The BMS 200 estimates the state of the battery 100 and manages the battery pack 100 using the estimated state information. For example, it estimates and manages state information of the battery 100, such as SOC, state of health (SOH), maximum input/output power tolerance, and output voltage of the battery 100. Then, the charging or discharging of the battery 100 is controlled using this state information. The BMS 200 according to the present invention includes an SOC estimation device for estimating the SOC of the battery 100. In addition, the BMS 200 controls cell balancing for balancing the charging state of each battery cell. That is, a battery cell having a relatively high charging state may be discharged and a battery cell having a relatively low charging state may be charged. Meanwhile, in order to manage the battery 100 using the BMS 200, a sensing unit for sensing the state of the battery 100 may be further included. The sensing unit may include a current sensor sensing a current of the battery 100, a voltage sensor sensing a voltage, and a temperature sensor sensing a temperature. At this time, at least one current sensor, voltage sensor, and temperature sensor may be provided, respectively. The BMS 200 performing various functions as described above may be made of various components and mounted on a predetermined substrate. That is, a plurality of components for SOC estimation, a plurality of components for cell balancing, a plurality of components constituting the sensing unit, and other passive elements may be mounted on the substrate.

3. Connection Control Unit

The connection control unit 300 sequentially connects the battery cells 110 to 140 to the BMS 200. That is, the connection control unit 300 sequentially connects the plurality of battery cells 110 to 140 to the BMS 200 one by one. For this, the connection control unit 300 may be provided between the battery 100 and the BMS 200, and may be mounted on a board on which the BMS 200 is mounted. That is, the connection control unit 300 may be provided on a substrate between the plurality of battery cells 110 to 150 and the IC of the BMS 200. Accordingly, the connection control unit 300 may be a part of the BMS 200. Meanwhile, in FIG. 2, V00, V01, V02, and V03 are connection terminals of the respective battery cells 110 to 140, and VC00, VC01, VC02, and VC03 are IC connection terminals inside the BMS 200. That is, the connection control unit 300 is provided between the connection terminals V00, V01, V02 and V03 of the respective battery cell 110 to 140 and the IC connection terminals VC00, VC01, VC02, VC03 of the BMS 200, thereby controlling the connection between each of the battery cells 110 to 140 and the IC of the BMS 200.

The connection control unit 300 may include a plurality of switching units 310 to 330 to control the connection with the BMS 200 of each of the plurality of battery cells 110 to 140. At this time, the lowermost battery cell 110 is directly connected to the BMS 200, that is, the IC, and the remaining battery cells 120 to 140 may be respectively connected to the BMS 200 through the switching units 310 to 330. Here, each of the plurality of switching units 310 to 330 may be switched according to the potential of the lower connection terminal and the potential of the corresponding connection terminal. That is, the first switching unit 310 is driven according to the voltage of the first battery cell 110 from the first connection terminal V00 and the voltage of the second battery cell 120 from the second connection terminal V01, so that the voltage of the second connection terminal V01 may be transferred to the second IC connection terminal VC01. In addition, the second switching unit 320 is driven according to the voltage of the second battery cell 120 from the second connection terminal V01 and the voltage of the third battery cell 130 from the third connection terminal V02, so that the voltage of the third connection terminal V02 may be transferred to the third IC connection terminal VC02. And, the third switching unit 330 is driven according to the voltage of the third battery cell 130 from the third connection terminal V02 and the voltage of the fourth battery cell 140 from the fourth connection terminal V03, so that the voltage of the fourth connection terminal V03 may be transferred to the fourth IC connection terminal VC03.

The configuration of the connection control unit 300 will be described in more detail as follows.

First, the lowermost battery cell 110 is directly connected to the IC of the BMS 200. That is, the connection terminal V00 of the lowermost battery cell 110, that is, the first connection terminal V00, is directly connected to the first IC connection terminal VC00 of the BMS 200 without passing through a switching unit. In addition, the connection terminal V00 of the lowermost battery cell 110 maintains the ground potential.

3.1. First Switching Unit

The first switching unit 310 may be provided between the connection terminal V01 of the second battery cell 120, that is, the second connection terminal V01, and the second IC connection terminal VC01 of the BMS 200. The first switching unit 310 is driven according to the potential of the first connection terminal V00 and the potential of the second connection terminal V01, so that the potential of the second battery cell 120, that is, the potential of the second connection terminal V01, may be transferred to the second IC connection terminal VC01 of the BMS 200. Also, the first switching unit 310 may control the second switching unit 320 according to the potential of the second connection terminal V01. The first switching unit 310 may include a first switch 311 and a second switch 312. That is, the first switch 311 is driven according to the potential of the first connection terminal V00 and the potential of the second connection terminal V01, so that the potential of the second connection terminal V01 is transferred to the second IC connection terminal VC01 of the BMS 200. In addition, the second switch 312 is driven according to the potential of the second connection terminal V01 transmitted through the first switch 311 to control the initial driving of the second switching unit 320. The first and second switches 311 and 312 of the first switching unit 310 will be described in more detail as follows.

The first switch 311 may include a first FET 311a and a first diode 311b. The first FET 311a is driven according to the potentials of the first connection terminal V00 and the second connection terminal V01 (i.e., driven according to the voltage of the first battery cell 110 and the voltage of the second battery cell 120), so that the voltage of the second battery cell 120 is transferred. That is, the gate terminal of the first FET 311a may be connected to the connection point of the first connection terminal V00 and the second connection terminal V01, that is, the first node Q11. In this case, the first resistor R11 may be provided between the gate terminal of the first FET 311a and the second connection terminal VC01. Accordingly, the potential of the second connection terminal VC01 may be applied to the gate terminal of the first FET 311a together with the potential of the first connection terminal V00 through the first resistor R11. This first FET 311a may be a P-type FET. In relation to the first FET 311a, the gate terminal may be connected to the first node Q11, the drain terminal may be connected to the second connection terminal V01, and the source terminal may be connected to a gate terminal of the second FET 312a of the second switch 312. The first diode 311b is connected in parallel to the first FET 311a. In this case, the first diode 311b may be connected in the reverse direction to the current movement path from the second connection terminal V01 to the second IC connection terminal VC01. That is, the first diode 311b may be forwardly connected between the connection point, that is, the third node Q13, of the source terminal of the first FET 311a and the gate terminal of the second FET 312a and the second connection terminal V01, that is, the second node Q12. The first diode 311b blocks the path from the second connection terminal V01 to the second IC connection terminal VC01 until the first FET 311a is turned on.

The second switch 312 may include a second FET 312a and a second diode 312b. The second FET 311a is driven according to the output terminal and the ground terminal of the first switch 311, so that the output of the first switch 311, that is, the voltage of the second battery cell 120, is transferred to the second IC connection terminal VC01. That is, the gate terminal of the second FET 312a may be connected to a connection point, that is, the third node Q13, between the source terminal and the ground terminal of the first FET 311a. In addition, in relation to the second FET 312a, the drain terminal is connected to the upper P-type FET, that is, the gate terminal of the third FET 321a of the third switch 321 of the second switching unit 320, and the source terminal may be connected to the ground terminal. That is, the second FET 312a may be connected to the gate terminal of the third switch 321 that transfers the potential of the third connection terminal V02 to the third IC connection terminal VC02. In this case, the second resistor R12 may be provided between the gate terminal and the ground terminal of the second FET 312a via the fourth node Q14. Accordingly, the output potential of the first switch 311 may be applied to the ground potential and the gate terminal of the second FET 312a through the second resistor R12. This second FET 312a may be an N-type FET. In relation to the second FET 312a, the gate terminal may be connected to the third node Q13, the drain terminal may be connected to a gate terminal of the third switch 321, that is, the fifth node Q15, and the source terminal may be connected to a ground terminal. The second diode 312b is connected in parallel to the second FET 312a. In this case, the second diode 312b may be connected in the reverse direction to the current movement path from the second connection terminal V01 to the second IC connection terminal VC01. That is, the second diode 312b may be reversely connected between the drain terminal and the source terminal of the second FET 312a. The second diode 312b maintains the potential of the third FET 321a of the third switch until the second FET 312a is turned on.

3.2. Second Switching Unit

The second switching unit 320 may be provided between the connection terminal V02 of the third battery cell 130, that is, the third connection terminal V02, and the third IC connection terminal VC02 of the BMS 200. The second switching unit 320 is driven according to the potential of the second connection terminal V01 and the potential of the third connection terminal V02, so that the potential of the third battery cell 130, that is, the potential of the third connection terminal V02, may be transferred to the third IC connection terminal VC02 of the BMS 200. Also, the second switching unit 320 may control the third switching unit 330 according to the potential of the third connection terminal V02. The second switching unit 320 may include a third switch 321 and a fourth switch 322. That is, the third switch 321 is driven according to the potential of the second connection terminal V01 and the potential of the third connection terminal V02, so that the potential of the third connection terminal V02 is transferred to the third IC connection terminal VC02 of the BMS 200. In addition, the fourth switch 322 is driven according to the potential of the third connection terminal V02 transmitted through the third switch 321 to control the initial driving of the third switching unit 330. The third and fourth switches 321 and 322 of the second switching unit 320 will be described in more detail as follows.

The third switch 321 may include a third FET 321a and a third diode 321b. The third FET 321a is driven according to the potentials of the second connection terminal V01 and the third connection terminal V02 (i.e., driven according to the voltage of the second battery cell 120 and the voltage of the third battery cell 130), so that the voltage of the third battery cell 130 is transferred. That is, the gate terminal of the third FET 321a may be connected to the drain terminal of the second FET 312a and the connection point of the third resistor R13, that is, the fifth node Q15. In this case, a third resistor R13 may be provided between the gate terminal of the third FET 321a and the third connection terminal VC02. Accordingly, the potential of the third connection terminal VC02 may be applied to the gate terminal of the third FET 321a together with the potential of the second connection terminal V01 through the third resistor R13. This third FET 321a may be a P-type FET. That is, in relation to the third FET 321a, the gate terminal may be connected to the fifth node Q15, the drain terminal may be connected to the third connection terminal V02, and the source terminal may be connected to the gate terminal of the fourth FET 322a of the fourth switch 322. The third diode 321b is connected in parallel to the third FET 321a. In this case, the third diode 321b may be connected in the reverse direction to the current movement path from the third connection terminal V02 to the third IC connection terminal VC02. That is, the third diode 321b may be forwardly connected between the connection point, that is, the seventh node Q17, of the source terminal of the third FET 321a and the gate terminal of the fourth FET 322a and the third connection terminal V02, that is, the sixth node Q16. This third diode 321b blocks the path from the third connection terminal V02 to the third IC connection terminal VC02 until the third FET 321a is turned on.

The fourth switch 322 may include a fourth FET 322a and a fourth diode 322b. The fourth FET 321a is driven according to the output terminal and the ground terminal of the third switch 321, so that the output of the third switch 321, that is, the voltage of the third battery cell 130, is transferred to the third IC connection terminal VC02. That is, the gate terminal of the fourth FET 322a may be connected to a connection point, that is, the seventh node Q17, between the source terminal and the ground terminal of the third FET 321a. In addition, in relation to the fourth FET 322a, the drain terminal may be connected to the upper P-type FET, that is, the gate terminal of the fifth FET 331a, of the fifth switch 331 of the third switching unit 330, and the source terminal may be connected to the ground terminal. That is, the fourth FET 322a may be connected to the gate terminal of the fifth switch 331 that transfers the potential of the fourth connection terminal V03 to the fourth IC connection terminal VC03. In this case, a fourth resistor R14 may be provided between the gate terminal and the ground terminal of the fourth FET 322a via eighth node Q18. Accordingly, the output potential of the third switch 321 may be applied to the ground potential and the gate terminal of the fourth FET 322a through the fourth resistor R14. This fourth FET 322a may be an N-type FET. That is, in relation to the fourth FET 322a, the gate terminal may be connected to the seventh node Q17, the drain terminal may be connected to the gate terminal of the fifth switch 331, that is, the ninth node Q19, and the source terminal may be connected to the ground terminal. The fourth diode 322b is connected in parallel to the fourth FET 322a. In this case, the fourth diode 322b may be connected in the reverse direction to the current movement path from the third connection terminal V02 to the third IC connection terminal VC02. That is, the fourth diode 322b may be reversely connected between the drain terminal and the source terminal of the fourth FET 322a. The fourth diode 322b maintains the potential of the fifth FET 331a of the fifth switch until the fourth FET 322a is turned on.

3.3. Third Switching Unit

The third switching unit 330 may be provided between the connection terminal V03 of the fourth battery cell 140, that is, the fourth connection terminal V03, and the fourth IC connection terminal VC03 of the BMS 200. The third switching unit 330 is driven according to the potential of the third connection terminal V02 and the potential of the fourth connection terminal V03, so that the potential of the fourth battery cell 140, that is, the potential of the fourth connection terminal V03, may be transferred to the fourth IC connection terminal VC03 of the BMS 200. The third switching unit 330 may include a fifth switch 331. That is, the fifth switch 331 is driven according to the potential of the third connection terminal V02 and the potential of the fourth connection terminal V03, so that the potential of the fourth connection terminal V03 is transferred to the fourth IC connection terminal VC03 of the BMS 200. The fifth switch 331 of the third switching unit 330 will be described in more detail as follows.

The fifth switch 331 may include a fifth FET 331a and a fifth diode 331b. The fifth FET 331a is driven according to the potentials of the third connection terminal V02 and the fourth connection terminal V03 (i.e., driven according to the voltage of the third battery cell 130 and the voltage of the fourth battery cell 140), so that the voltage of the fourth battery cell 140 is transferred. That is, the gate terminal of the fifth FET 331a may be connected to the drain terminal of the fourth FET 322a and the connection point of the fifth resistor R15, that is, the tenth node Q20. In this case, a fifth resistor R15 may be provided between the gate terminal of the fifth FET 331a and the fourth connection terminal VC03. Accordingly, the potential of the fourth connection terminal VC03 may be applied to the gate terminal of the fifth FET 331a together with the potential of the third connection terminal V02 through the fifth resistor R15. This fifth FET 331a may be a P-type FET. That is, in relation to the fifth FET 331a, the gate terminal may be connected to the ninth node Q19, the drain terminal may be connected to the fourth connection terminal V03, and the source terminal may be connected to the fourth IC connection terminal VC03. The fifth diode 331b is connected in parallel to the fifth FET 331a. In this case, the fifth diode 331b may be connected in the reverse direction to the current movement path from the fourth connection terminal V03 to the fourth IC connection terminal VC03. That is, the fifth diode 331b is forwardly connected between the source terminal of the fifth FET 331a and the connection point, that is, the tenth node Q20, of the fourth IC connection terminal VC03 and the fourth connection terminal V03. This fifth diode 331b blocks the path from the fourth connection terminal V03 to the fourth IC connection terminal VC03 until the fifth FET 331a is turned on.

As described above, the connection terminal of the lowermost battery cell 110, that is, the first connection terminal V00, is directly connected to the first IC connection terminal VC00 of the BMS 200, and the connection terminal of the uppermost battery cell 140, that is, the fourth connection terminal V03, is connected to the fourth IC connection terminal VC03 through the third switch 330 including one P-type FET 331a. In addition, in relation to the battery cells 120 and 130 between the lowermost battery cell 110 and the uppermost battery cell 140, the connection terminals V01 and V02 are connected to the second and third IC connection terminals VC01 and VC02 through the switches 311 and 321 including P-type FETs 311a and 321a and switches 312 and 322 including N-type FETs 312a and 322a, respectively. That is, the connection control unit 300 according to the present invention includes switches 311 and 321 including P-type FETs 311a and 321a for connecting the battery cells 120 and 130 between the lowermost battery cell 110, respectively, and the uppermost battery cell 140, and switches 312 and 322 including N-type FETs 312a and 322a, respectively, so that the switching units 310 and 320 are configured, and the switching unit 330 including the P-type FET 331 is configured to connect the uppermost battery cell 110. In addition, the connection control unit 300 allows the first connection terminal V00 of the lowermost battery cell 110 to be directly connected to the first IC connection terminal VC00 of the BMS 200.

That is, the connection control unit may be sequentially connected to the IC of the BMS from a battery cell having a lower order to a battery cell having a higher order, that is, from a lower order to a higher order. However, when random battery cells are connected randomly without being connected in order, the corresponding battery cells may be connected to the IC of the BMS 200 only when they are sequentially connected without being connected to the IC of the BMS 200.

Figure 3:
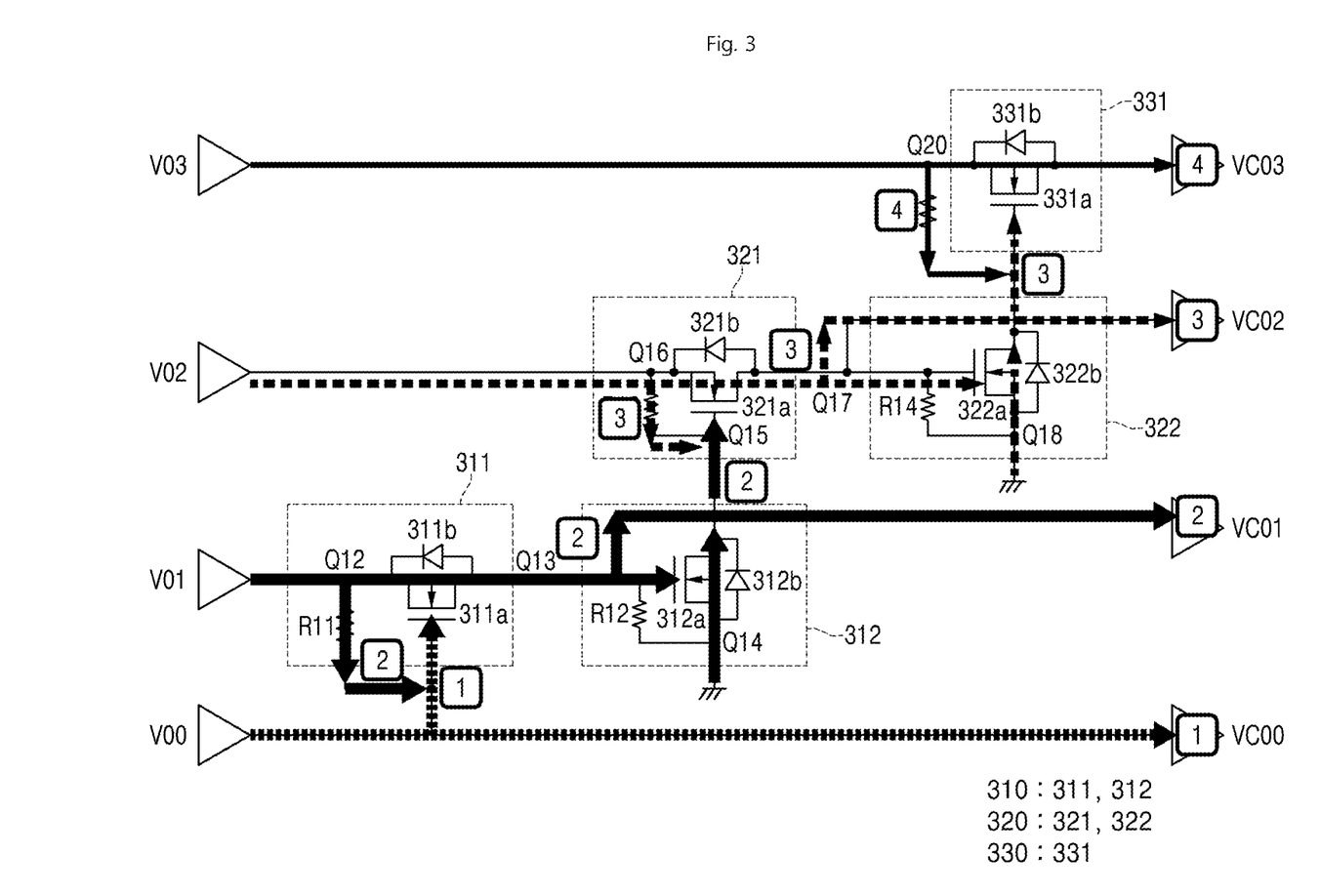
FIGS. 3 and 4 are schematic diagrams for explaining a method of driving a battery apparatus according to an embodiment of the present invention.
Figure 4:
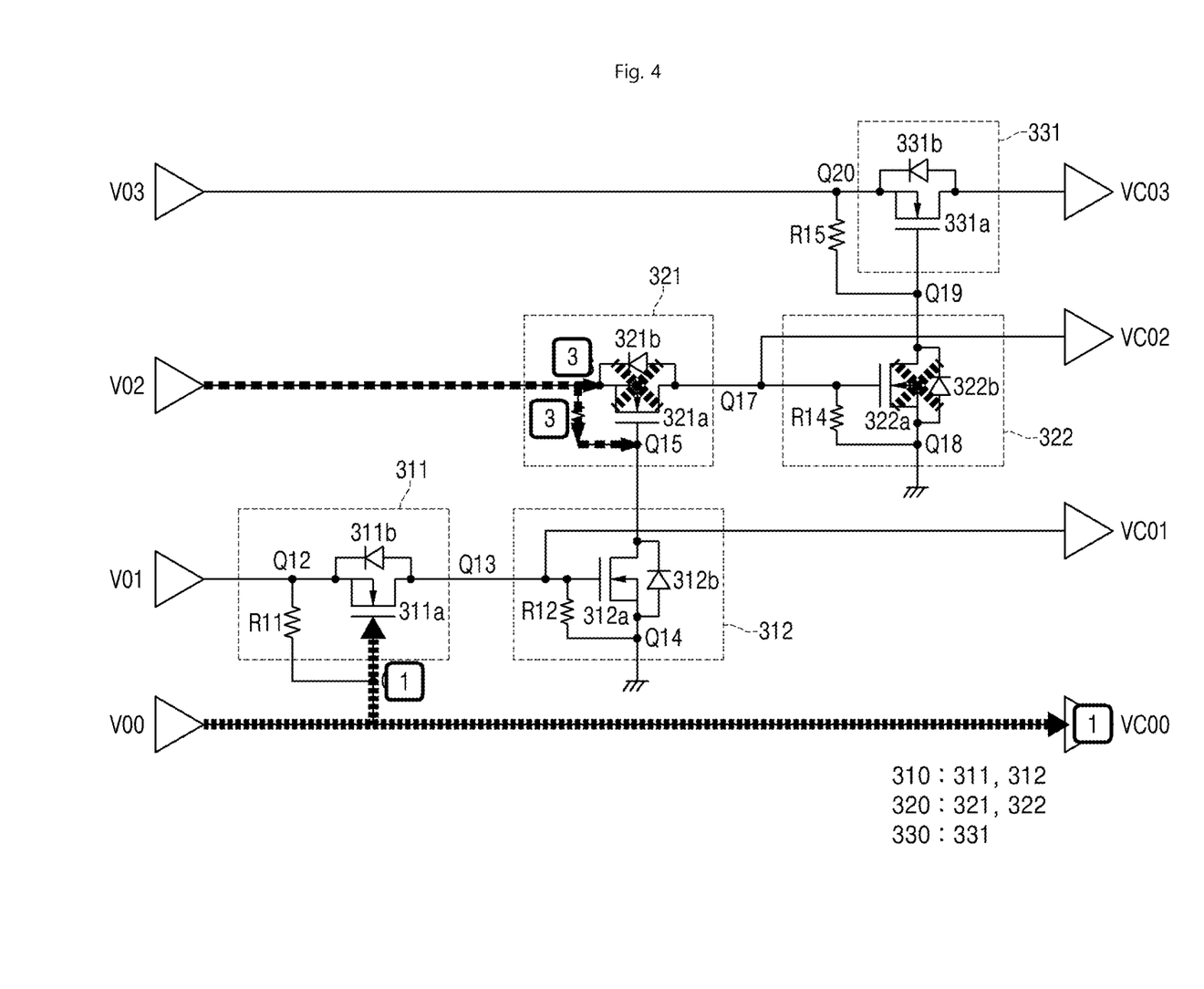

FIGS. 3 and 4 show a method of driving a battery apparatus, i.e., a method of connecting a battery cell and a BMS, according to an embodiment of the present invention. Here, FIG. 3 is a schematic diagram of a case in which battery cells are connected from a low order to a high order, that is, in the order of the first, second, third, and fourth battery cells 110, 120, 130, and 140. Also, FIG. 4 is a schematic diagram of a case in which battery cells are connected randomly rather than sequentially.

As shown in FIG. 3, the connection terminal V00 of the first battery cell 110 is connected to the first IC connection terminal VC00 to maintain the ground potential (1).

In this state, when the voltage of the second battery cell 120 is applied through the second connection terminal V01 (i.e., when the second connection terminal V01 of the second battery cell 120 is connected to the second IC connection terminal VC01 of the BMS 200), the gate terminal of the first FET 311a, i.e., the first node Q11, maintains the potential of the first connection terminal V00 and the potential of the second connection terminal V01. Accordingly, the first FET 311a is turned on, and accordingly, the potential of the second connection terminal V01 is applied to the second IC connection terminal VC01 (2). That is, the second battery cell 120 is connected to the IC of the BMS 200. At this time, the potential of the second connection terminal V01 applied through the first FET 311a is applied to the gate terminal of the second FET 312a to turn on the second FET 312a. Since the second FET 312a is turned on, the fifth node Q15 may maintain the ground potential.

In a state where the potential of the second battery cell 120 is applied to the second IC connection terminal VC01 through the second connection terminal V01 and the fifth node Q15 maintains the ground potential, when the voltage of the third battery cell 130 is applied through the third connection terminal V02, the gate terminal of the third FET 321a, i.e., the fifth node Q15, maintains the ground potential and the potential of the third connection terminal V02. Accordingly, the third FET 321a is turned on, and accordingly, the potential of the third connection terminal V02 is applied to the third IC connection terminal VC02 (3). That is, the third battery cell 130 is connected to the IC of the BMS 200. At this time, the potential of the third connection terminal V02 applied through the third FET 321a is applied to the gate terminal of the fourth FET 322a to turn on the fourth FET 322a. Since the fourth FET 332a is turned on, the ninth node Q19 may maintain the ground potential.

In a state where the potential of the third battery cell 130 is applied to the third IC connection terminal VC02 through the third connection terminal V02 and the ninth node Q19 maintains the ground potential, when the voltage of the fourth battery cell 140 is applied through the fourth connection terminal V03, the gate terminal of the fifth FET

331a, that is, the ninth node Q19, maintains the ground potential and the potential of the fourth connection terminal V03. Accordingly, the fifth FET 331a is turned on, and accordingly, the potential of the fourth connection terminal V03 is applied to the fourth IC connection terminal VC03 (4). That is, the fourth battery cell 140 is connected to the IC of the BMS 200.

As described above, when battery cells are sequentially connected from a lower-order battery cell to a higher-order battery cell, that is, when the first, second, third, and fourth battery cells 110, 120, 130, and 140 are connected in order, the connection control unit 300 may be connected to the IC of the BMS 200 in order from a low order to a high order.

However, as shown in FIG. 4, in the state (1) in which the connection terminal V00 of the first battery cell 110 is connected to the first IC connection terminal VC00 to maintain the ground potential, when a voltage is applied through the connection terminal V01 of the third battery cell 110, the second battery cell 120 is not connected to the BMS 200, so that the third battery cell 130 is not connected to the BMS 200. However, when a voltage is applied through the connection terminal V01 of the second battery cell 120, after the second battery cell 120 is connected to the BMS 200, as described with reference to FIG. 3, the third battery cell 130 may be connected to the BMS 200.

As described above, the connection control unit may be sequentially connected to the IC of the BMS from a battery cell having a lower order to a battery cell having a higher order, that is, from a lower order to a higher order. However, when random battery cells are connected randomly without being connected in order, the corresponding battery cells may be connected to the IC of the BMS 200 only when they are sequentially connected without being connected to the IC of the BMS 200.

Therefore, since it is not necessary to apply a solder eye, it is possible to prevent an increase in manufacturing cost. In addition, even when the operator performs soldering in order, it is possible to prevent the occurrence of defects due to the inexperience of the operator, that is, electrical damage to the IC of the BMS 200.

As described above, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A battery apparatus comprising:
a battery comprising plurality of battery cells;
a battery management system (BMS) configured to manage the plurality of battery cells; and
a connection controller configured to sequentially connect the plurality of battery cells to the BMS,
wherein the connection controller is configured to connect a corresponding battery cell among the plurality of battery cells to the BMS according to a potential of a lower battery cell located at a first end portion of the battery that is connected to the BMS before the corresponding battery cell and a potential of the corresponding battery cell.

2. The battery apparatus of claim 1, wherein the connection controller allows the plurality of battery cells from the lower battery cell located at the first end portion of the battery to an upper battery cell located at a second end portion of the battery opposite to the first end portion to be sequentially connected to the BMS in one direction.

3. The battery apparatus of claim 2, wherein according to the connection controller, when battery cells among the plurality of battery cells are connected randomly, a first battery cell is not connected to the BMS and when battery cells among the plurality of battery cells are connected in sequence, the first battery cell is connected to the BMS.

4. The battery apparatus of claim 2, wherein the connection controller is mounted on a substrate on which the BMS is mounted.

5. The battery apparatus of claim 4, wherein the connection controller is provided between a plurality of connection terminals, each connection terminal extending from a respective one of the plurality of battery cells, and an integrated circuit (IC) connection terminal of the BMS.

6. The battery apparatus of claim 2, wherein the connection controller comprises a plurality of switches.

7. The battery apparatus of claim 6, wherein the plurality of switches are driven according to the potential of the lower battery cell located at the first end portion of the battery and the potential of the corresponding battery cell to apply the potential of the corresponding battery cell to the BMS.

8. The battery apparatus of claim 6, wherein the connection controller allows lowermost battery cell located at the first end portion of the battery among the plurality of battery cells to be directly connected to the BMS, allows an uppermost battery cell located at the second end portion of the battery among the plurality of battery cells to be connected to the BMS through one switch among the plurality of switches, and allows battery cells among the plurality of battery cells between the lowermost battery cell located at the first end portion of the battery and the uppermost battery cell located at the second end portion of the battery to be connected to the BIMS through two switches among the plurality of switches.

9. The battery apparatus of claim 8, wherein the uppermost battery cell located at the second end portion of the battery is connected to the BMS through a P-type field-effect transistor (FET), and the battery cells between the lowermost battery cell located at the first end portion of the battery and the uppermost battery cell located at the second end portion of the battery are connected to the BMS through the P-type FET and an N-type FET.

10. The battery apparatus of claim 9, wherein P-type FETs of the battery cells between the lowermost battery cell located at the first end portion of the battery and the uppermost battery cell located at the second end portion of the battery are driven according to the potential of the lower battery cell and the potential of the corresponding battery cell to transfer the potential of the corresponding battery cell to the BMS, and
wherein the N-type FET is driven according to a ground potential and the potential of the corresponding battery cell to maintain an initial potential of the P-type FET of the upper battery cell located at the second end portion of the battery.

11. The battery apparatus of claim 10, further comprising diodes connected in parallel to the P-type FETs and the N-type FET, respectively.

12. The battery apparatus of claim 1, wherein the lower battery cell located at the first end portion of the battery is connected to the BMS without an intervening switch, and
wherein other battery cells of the plurality of battery cells are connected to the BMS through a plurality of switches.

13. The battery apparatus of claim 1, wherein the connection controller has a same number of input ports configured to connect to each respective battery cell of the plurality of battery cells as a number of output ports configured to connect the connection controller to the BMS.

14. The battery apparatus of claim 1, wherein a battery cell of the plurality of battery cells adjacent to the lower battery cell located at the first end portion of the battery is connected to the BMS through a line including a first switch and a second switch.

15. The battery apparatus of claim 14, wherein an upper battery cell located at a second end portion of the battery opposite to the first end portion is connected to the BMS through a line including a third switch.

16. The battery apparatus of claim 15, wherein each of the first to third switches includes a field-effect transistor (FET) and a diode.

17. The battery apparatus of claim 16, wherein the FET and diode of each of the first to third switches are connected in parallel, respectively.

18. The battery apparatus of claim 16, wherein each of the first to third switches further includes a resistor located closer to the plurality of battery cells than the BMS.

\* \* \* \* \*